United States Patent
Zhang et al.

(10) Patent No.: US 9,390,274 B2
(45) Date of Patent: Jul. 12, 2016

(54) MEDIA DATA PROCESSING METHOD AND APPARATUS

(71) Applicant: Huawei Technologies Co., Ltd., Shenzhen, Guangdong (CN)

(72) Inventors: Shaobo Zhang, Shenzhen (CN); Xin Wang, Santa Clara, CA (US); Yongliang Liu, Beijing (CN); Shiguo Lian, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 14/010,276

(22) Filed: Aug. 26, 2013

(65) Prior Publication Data

US 2013/0347123 A1 Dec. 26, 2013

Related U.S. Application Data

(63) Continuation of application No. PCT/CN2011/083304, filed on Dec. 1, 2011.

(30) Foreign Application Priority Data

Mar. 22, 2011 (CN) .......................... 2011 1 0069265

(51) Int. Cl.
*G06F 21/00* (2013.01)
*G06F 21/60* (2013.01)
*H04L 29/06* (2006.01)
*H04L 29/08* (2006.01)

(52) U.S. Cl.
CPC ............ *G06F 21/60* (2013.01); *H04L 65/1069* (2013.01); *H04L 67/141* (2013.01)

(58) Field of Classification Search
CPC combination set(s) only.
See application file for complete search history.

(56) References Cited

U.S. PATENT DOCUMENTS

2006/0156351 A1  7/2006  Gentric et al.
2008/0086757 A1*  4/2008  Pestoni .......................... 726/2

(Continued)

FOREIGN PATENT DOCUMENTS

CN  1817040 A  8/2006
CN  1937495 A  3/2007

(Continued)

OTHER PUBLICATIONS

Open IPTV Forum-Release 2 Specification, "HTTP Adaptive Streaming", Draft V0.0.4.01, XP050437971, Apr. 23, 2010, total 25 pages.
Frank Hartung et al: "DRM Protected Dynamic Adaptive HTTP Streaming", XP055064987, Feb. 2011, total 6 pages.
"Tuning into a Live HTTP Stream with Client Controlled Adaptation", 3GPP TSG-SA4 #55, Research in Motion UK Limited, Aug. 17-21, 2009, 3 pages.

(Continued)

*Primary Examiner* — Jeffrey Pwu
*Assistant Examiner* — William Corum, Jr.
(74) *Attorney, Agent, or Firm* — Huawei Technologies Co., Ltd.

(57) ABSTRACT

Embodiments of the present invention provide a media data processing method and apparatus. The media data processing method includes: obtaining each media segment in a coding representation; and performing content protection processing on at least a part of media segments in the coding representation. In the embodiments of the present invention, a media segment in a coding representation is used as a unit of content protection, and the content protection may be performed on at least a part of media segments in the coding representation, so that protection manners of media segments in the coding representation are differentiated, so as to improve reliability and flexibility of performing the content protection on an HTTP streaming media service.

10 Claims, 11 Drawing Sheets

(56) References Cited

U.S. PATENT DOCUMENTS

| | | | |
|---|---|---|---|
| 2009/0169001 A1 | 7/2009 | Tighe et al. | |
| 2009/0235361 A1* | 9/2009 | Sloo et al. | 726/26 |
| 2010/0189257 A1 | 7/2010 | Bjorkengren et al. | |
| 2010/0223394 A1 | 9/2010 | Sherer et al. | |
| 2012/0110138 A1 | 5/2012 | Zhang | |
| 2012/0233345 A1* | 9/2012 | Hannuksela | 709/231 |
| 2013/0007223 A1* | 1/2013 | Luby et al. | 709/219 |

FOREIGN PATENT DOCUMENTS

| | | |
|---|---|---|
| CN | 101282348 A | 10/2008 |
| CN | 101442657 A | 5/2009 |
| CN | 101516057 A | 8/2009 |
| CN | 101521570 A | 9/2009 |
| CN | 101534433 A | 9/2009 |

OTHER PUBLICATIONS

"Content Protection", 3GPP TSG-SA4 Meeting #61, Huawei Technologies Co., Ltd, China Mobile Communications, Nov. 8-12, 2010, 5 pages.

"Universal Mobile Telecommunications System (UMTS); LTE; Transparent end-to-end Packet-switched Streaming Service (PSS); Protocols and codecs (3GPP TS 26.234 version 9.4.0 Release 9)", ETSI TS 126 234 v9.4.0, Oct. 2010, 190 pages.

International Search Report dated Mar. 15, 2012 in connection with International Patent Application No. PCT/CN2011/083304.

"3rd Generation Partnership Project;Technical Specification Group Services and System Aspects;Transparent end-to-end Packet-switched Streaming Service (PSS); Protocols and codecs (Release 9)", 3GPP TS 26.234 V9.4.0, Sep. 2010, total 187 pages.

* cited by examiner

US 9,390,274 B2

MEDIA DATA PROCESSING METHOD AND APPARATUS

CROSS-REFERENCE TO RELATED APPLICATIONS

This application is a continuation of International Application No. PCT/CN2011/083304, filed on Dec. 1, 2011, which claims priority to Chinese Patent Application No. 201110069265.3, filed on Mar. 22, 2011, both of which are hereby incorporated by reference in their entireties.

TECHNICAL FIELD

Embodiments of the present invention relate to audio/video technologies, and in particular, to a media data processing method and apparatus.

BACKGROUND

With the popularization of the Internet, streaming media services have developed rapidly, and a streaming media service based on a hyper text transfer protocol (Hyper Text Transfer Protocol, HTTP for short) is one of them.

In the prior art, content protection is performed on the HTTP streaming media service, so that rights and interests of an owner of streaming media content are protected. Specifically, in an HTTP streaming standard of the 3GPP, the content protection is based on a period. A period corresponds to a duration of a certain content segment, and there is at least one coding representation in the period, and each coding representation includes several media segments. A media segment in each coding representation adopts a same protection manner. The so-called protection manner refers to a protection method adopted for content that needs to be protected and related information applied to the method, for example, the protection method may be an encryption algorithm, and related information of the method is a key corresponding to the encryption algorithm or a means of obtaining a key of the encryption algorithm.

However, during a process of implementing the present invention, the inventors find that: In the prior art, a content protection manner adopted for the HTTP streaming media service is of low flexibility, and fails to meet a diverse requirement when a content provider limits accessing of a streaming media service by a user.

SUMMARY

Embodiments of the present invention provide a media data processing method and apparatus, so as to improve flexibility of a content protection manner.

An embodiment of the present invention provides a media data processing method, including:

obtaining each media segment in a coding representation; and performing content protection processing on at least a part of media segments in the coding representation.

An embodiment of the present invention provides another media data processing method, including:

sending a media segment request message to a media server, where the media segment request message includes identification information of a requested media segment;

receiving a media segment which is sent by the media server according to the identification information; and processing the received media segment according to a media presentation description file, where the media presentation description file is used to describe a content protection manner adopted by at least a part of media segments in a coding representation.

An embodiment of the present invention provides another media data processing method, including:

sending a media segment request message to a media server, where the media segment request message includes identification information of a requested media segment;

receiving a media segment which is sent by the media server according to the identification information; and processing the media segment according to a media segment protection element included in the media segment, where the media segment protection element includes content protection method information adopted by the media segment.

An embodiment of the present invention provides a media data processing apparatus, including:

an obtaining module, configured to obtain each media segment in a coding representation; and a content protection processing module, configured to perform content protection processing on at least a part of media segments in the coding representation.

An embodiment of the present invention provides another media data processing apparatus, including:

a first sending module, configured to send a media segment request message to a media server, where the media segment request message includes identification information of a requested media segment;

a first receiving module, configured to receive a media segment which is sent by the media server according to the identification information; and a first processing module, configured to process the received media segment according to a media presentation description file, where the media presentation description file is used to describe a content protection manner adopted by at least a part of media segments in a coding representation.

An embodiment of the present invention provides another media data processing apparatus, including:

a second sending module, configured to send a media segment request message to a media server, where the media segment request message includes identification information of a requested media segment;

a second receiving module, configured to receive a media segment which is sent by the media server according to the identification information; and a second processing module, configured to process the media segment according to a media segment protection element included in the media segment, where the media segment protection element includes content protection method information adopted by the media segment.

In the embodiments of the present invention, a media segment in a coding representation is used as a unit of content protection, and the content protection may be performed on at least a part of media segments in the coding representation, so that protection manners of media segments in the coding representation are differentiated, so as to improve flexibility of performing the content protection on an HTTP streaming media service, thereby meeting a requirement when a content provider only limits accessing of some certain media segments by a user and opens a remaining media segment.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may further obtain other drawings according to these accompanying drawings without creative efforts.

FIG. 4b is a schematic structural diagram of a coding representation module corresponding to a processing manner shown in FIG. 4a;

FIG. 5 is a specific schematic structural diagram of the content protection unit shown in FIG. 3a;

FIG. 6 is another specific schematic structural diagram of the content protection unit shown in FIG. 3a;

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
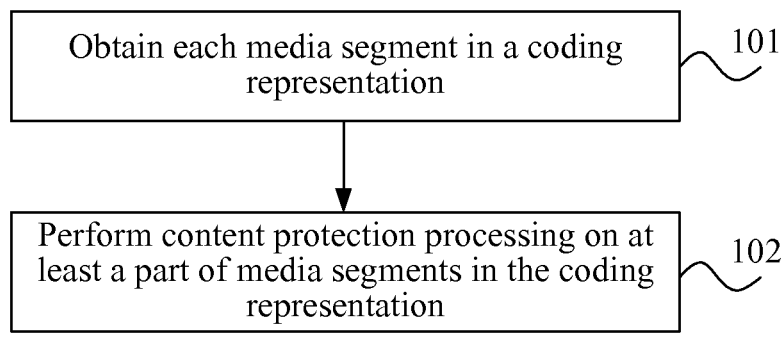
FIG. 1 is a flowchart of a first embodiment of a media data processing method according to the present invention.

FIG. 1 is a flowchart of a first embodiment of a media data processing method according to the present invention, and as shown in FIG. 1, the method in this embodiment may include:

Step 101: Obtain each media segment in a coding representation.

For example, a content protection apparatus may obtain a coding representation of content (encoded versions of the content). The coding representation is a digitalized form of content, and may be, for example, coding of an independent media component, such as image coding; or may be multiplexing of coding of multiple media components, including, for example, image coding and audio coding. The coding representation may include multiple media segments (Segment) in terms of time.

Specifically, a content obtaining apparatus may input collected content, such as sound or an image, into an encoder, so as to generate a digitalized form of coding representation, and the coding representation is segmented according to a length of (approximately) equal media time, and is encapsulated in an appropriate media transmission format, so as to form a media segment. A common media transmission format may be, for example, a moving picture experts group 2 transport stream (Moving Picture Experts Group 2 Transport Stream, MPEG2-TS for short) or an International Organization for Standards Basic Media File Format (International Organization for Standards Basic Media File Format, ISO BMFF for short). Generally, in one coding representation, lengths of media time that correspond to media segments are roughly equal; an initialization segment is a special media segment and only includes metadata of the coding representation, may be used to initialize a decoding device, does not include coded media data, and does not correspond to media presentation time. If the coding representation only has one media segment, an initialization segment and the media segment may be together.

Step 102: Perform content protection processing on at least a part of media segments in the coding representation.

For example, the content protection apparatus may perform content protection processing on at least a part of media segments in the coding representation generated by the content obtaining apparatus.

Specifically, in the prior art, a period (Period) is used as a unit in content protection. At a border of the period, an attribute of the coding representation may have some changes in, for example, a source or a location of content, an increase or a decrease in the number of coding representations, and a source coding manner and a protection manner of the coding representation. However, in one period, a content protection manner adopted by one coding representation cannot be changed, that is, all media segments in the coding representation must adopt a same protection manner. However, in some certain situations, that the media segments in the coding representation all adopt the same protection manner cannot meet a requirement. Taking a football match video as an example for description, most content of the video are unprotected while some wonderful goal scenes are protected, and only an authorized user can watch complete video content of the football match; therefore, the unprotected content and the protected content of the football match video need to adopt differentiated protection manners. However, in the prior art, content protection is performed on a whole coding representation; therefore, all media segments of the football match video adopt a same content protection manner, that is, either all media segments are unprotected, or all media segments are protected; more generally, in the prior art, that different content protection manners are adopted for different parts of a same coding representation cannot be implemented, so that in the prior art, flexibility of a content protection manner adopted for an HTTP streaming media service is low, and a diverse requirement when a content provider limits accessing of a streaming media service by a user cannot be met.

By comparison, in this embodiment, the content protection apparatus performs the content protection processing on the at least a part of media segments in the coding representation. The so-called at least a part of media segments may be a part of media segments in the coding representation, or may be all media segments in the coding representation, and regardless of a part of media segments or all media segments, a processing granularity of the content protection apparatus is a media segment rather than the coding representation. For example, the content protection apparatus may perform content protection on a media segment including a wonderful goal in several media segments in a coding representation of the football match video, and does not perform the content protection on a remaining media segment. It should be noted that, media segments having multiple wonderful goals may be included in a video of one football match; therefore, the content protection apparatus may separately perform content protection on a media segment including each wonderful goal, and video data of each wonderful goal may include multiple media segments in a duration; therefore, the content protection apparatus needs to perform content protection on multiple media segments, that is, media segments in a certain time range or an index range when performing the content protection on each media segment including a wonderful goal.

It should be noted that, in this embodiment, a manner of performing the content protection processing may include a content protection method, and may also include relevant information required when the content protection processing is performed by using the content protection method. For example, the content protection method may be an adopted encryption algorithm, and the required relevant information may be a key of the encryption algorithm or a key obtaining method.

It should be noted that, this embodiment does not limit a specific content protection method specifically adopted by the content protection apparatus to perform video protection on the media segment, for example, the content protection method may be an encryption method or a license method. In addition, this embodiment also does not need to limit a specific form specifically adopted to implement the content protection apparatus, and persons skilled in the art may understand that, the content protection apparatus may be implemented in a software form, and may also be implemented in a hardware form deployed on a computer system.

In this embodiment, a media segment in a coding representation is used as a unit of content protection, and the content protection may be performed on at least a part of media segments in the coding representation, so that protection manners of media segments in the coding representation are differentiated, so as to improve flexibility of performing the content protection on an HTTP streaming media service, thereby meeting a requirement when a content provider only limits accessing of some certain media segments by a user and opens a remaining media segment.

After the content protection processing is performed on each media segment in the coding representation by adopting the foregoing method shown in FIG. 1, in order to enable a client to know a specific content protection manner adopted by the coding representation, so as to adopt a matched processing manner to process the coding representation, the embodiment of the present invention may be implemented by adopting two specific solutions. In one solution, when the content protection processing is performed on a media segment that needs to be protected, a media presentation description (Media Presentation Description, MPD for short) file may be generated, and the client may obtain the MPD file, so as to know the content protection manner adopted by the coding representation; and in another solution, after the content protection processing is performed on a media segment that needs to be protected, a media segment protection element is added in the media segment on which the protection processing is performed, where the media segment protection element is used to describe a content protection manner of the media segment.

The foregoing two technical solutions are described in detail by adopting several specific embodiments in the following.

Figure 2:
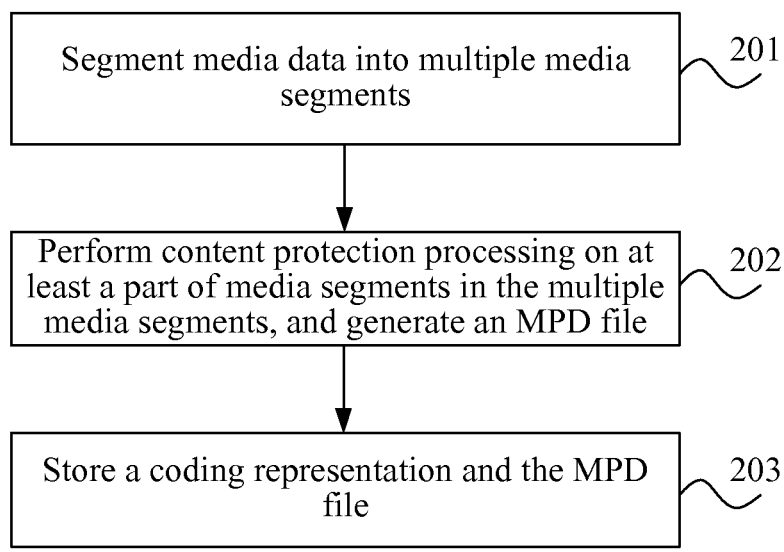
FIG. 2 is a flowchart of a second embodiment of a media data processing method according to the present invention.

FIG. 2 is a flowchart of a second embodiment of a media data processing method according to the present invention, and as shown in FIG. 2, the method in this embodiment may implement the foregoing first solution, and the method in this embodiment may include:

Step 201: Segment media data into multiple media segments.

An implementation principle of step 201 is similar to that of step 101 in the foregoing method embodiment shown in FIG. 1, so details are not repeatedly described herein.

Step 202: Perform content protection processing on at least a part of media segments in the multiple media segments, and generate an MPD file.

A content protection apparatus may perform content protection processing on a part of media segments in the multiple media segments after the segmentation, and may also perform the content protection processing on all media segments; persons skilled in the art may perform a selection as required.

In this embodiment, the MPD file may include a coding representation module used to describe a content protection manner adopted by at least a part of media segments in a coding representation. In this embodiment, the coding representation module may include at least one content protection unit, and the content protection unit corresponds to a certain content protection manner. In this embodiment, the content protection unit may include content protection method information and at least one protection range element, where the content protection method information is used to indicate a content protection method, and the protection range element includes information of a range of a media segment to which the content protection method information applies.

Specifically, the MPD file may include information required by a client to access a media segment, so as to connect a server and the client. The MPD file may include the coding representation module to describe an attribute of the coding representation. According to whether the content protection processing is performed on the media segment in the coding representation, the coding representation module may selectively include a content protection unit, or in a case that the content protection processing is performed, selectively include, according to different adopted content protection method information, a content protection unit corresponding to each piece of the content protection method information. For each content protection unit, content protection method information and a protection range element may be included. If the content protection processing is not performed on the coding representation, the coding representation module may not include the content protection unit.

In this embodiment, the range information included in the protection range element may use a start index and an end index of a media segment to describe an application range of the content protection unit, or use a start index of a media segment and a length of a protection range, that is, the number of consecutive protected media segments, to describe an application range of the content protection unit, or use start time and end time to describe an application range of the content protection unit, or use start time and a duration of protected media duration to describe an application range of the content protection unit, that is, media segments to which the content protection method information in the content protection unit is effective. Only when the content protection method information indicated by the content protection unit applies to all media segments of the coding representation, the protection range element may be omitted in the content protection unit; otherwise, the content protection unit includes at least one protection range element. The content protection method information in the content protection unit does not apply to a media segment beyond a range indicated by the protection range element.

Figure 3A:
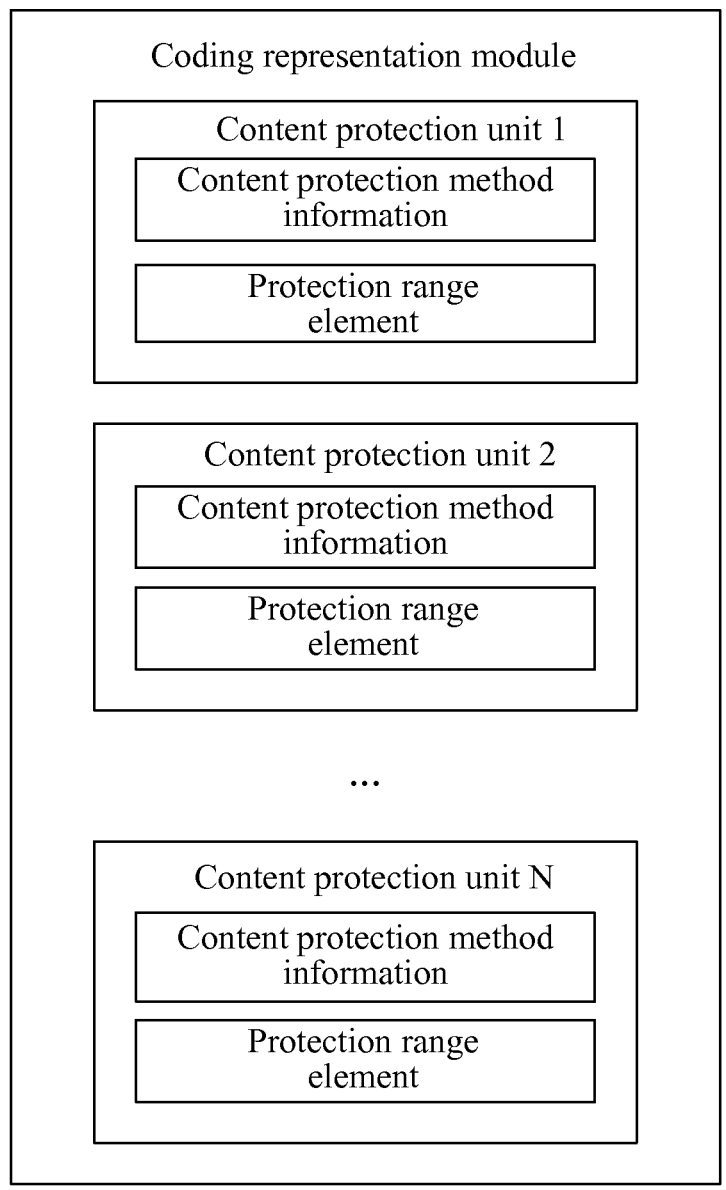
FIG. 3a is a schematic structural diagram of a general coding representation module adopted in an embodiment of the present invention.

FIG. 3a is a schematic structural diagram of a general coding representation module adopted in an embodiment of the present invention, and as shown in FIG. 3a, the coding representation module may include N content protection units, and each content protection unit may include content protection method information and a protection range element. It should be noted that, the content protection method information may include a content protection method and information related to the content protection method, where the former is, for example, an encryption method, and the latter is, for example, key information and license information; therefore, even though different media segments of a coding representation adopt a same content protection method, information related to the used content protection method is different, and different content protection method information is still adopted. For example, media segments all adopt a certain encryption algorithm; however, a key is constantly changed; in this way, an objective of time-varying content protection is achieved.

Figure 3B:
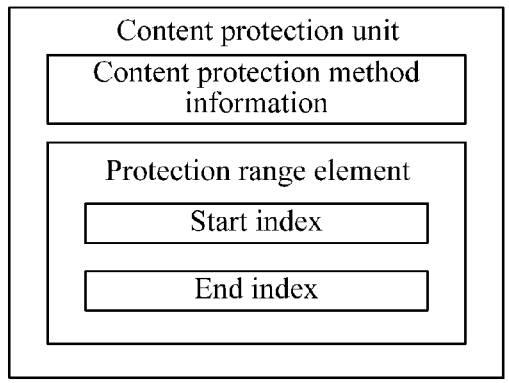
FIG. 3b is a schematic structural diagram of a content protection unit for describing a protection range by adopting a start index and an end index.
Figure 3C:
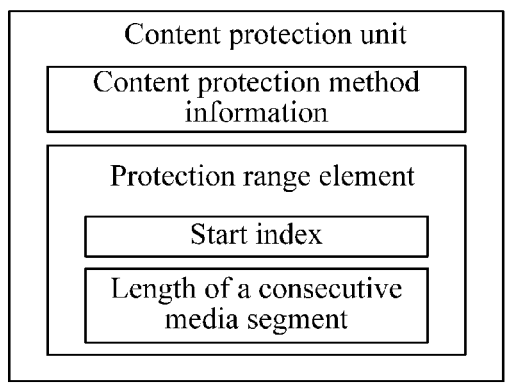
FIG. 3c is a schematic structural diagram of a content protection unit for describing a protection range by adopting a start index and a length of a consecutive media segment.

Based on the general structure in FIG. 3a, persons skilled in the art may transform the content protection unit in FIG. 3a into different structures for different description manners of a protection range. FIG. 3b is a schematic structural diagram of a content protection unit for describing a protection range by adopting a start index and an end index, and FIG. 3c is a schematic structural diagram of a content protection unit for describing a protection range by adopting a start index and a length of a consecutive media segment.

Based on structures of the foregoing content protection units in FIG. 3a to FIG. 3c, the content protection unit in the method embodiment shown in FIG. 2 is described in detail by using a specific example in the following.

Figure 4A:
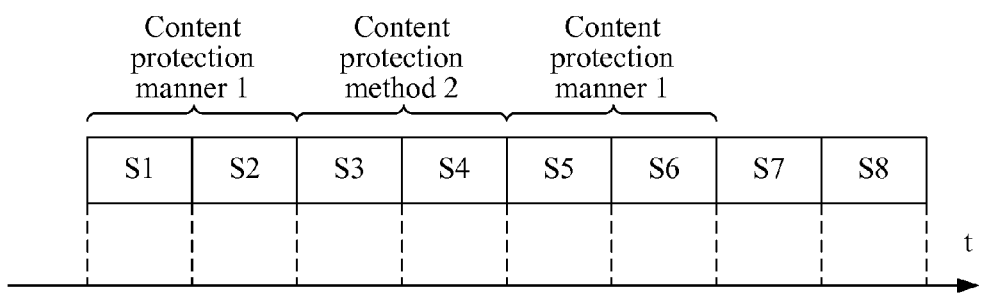
FIG. 4a is a schematic diagram illustrating content protection processing of the method embodiment shown in FIG. 2.
Figure 4B:
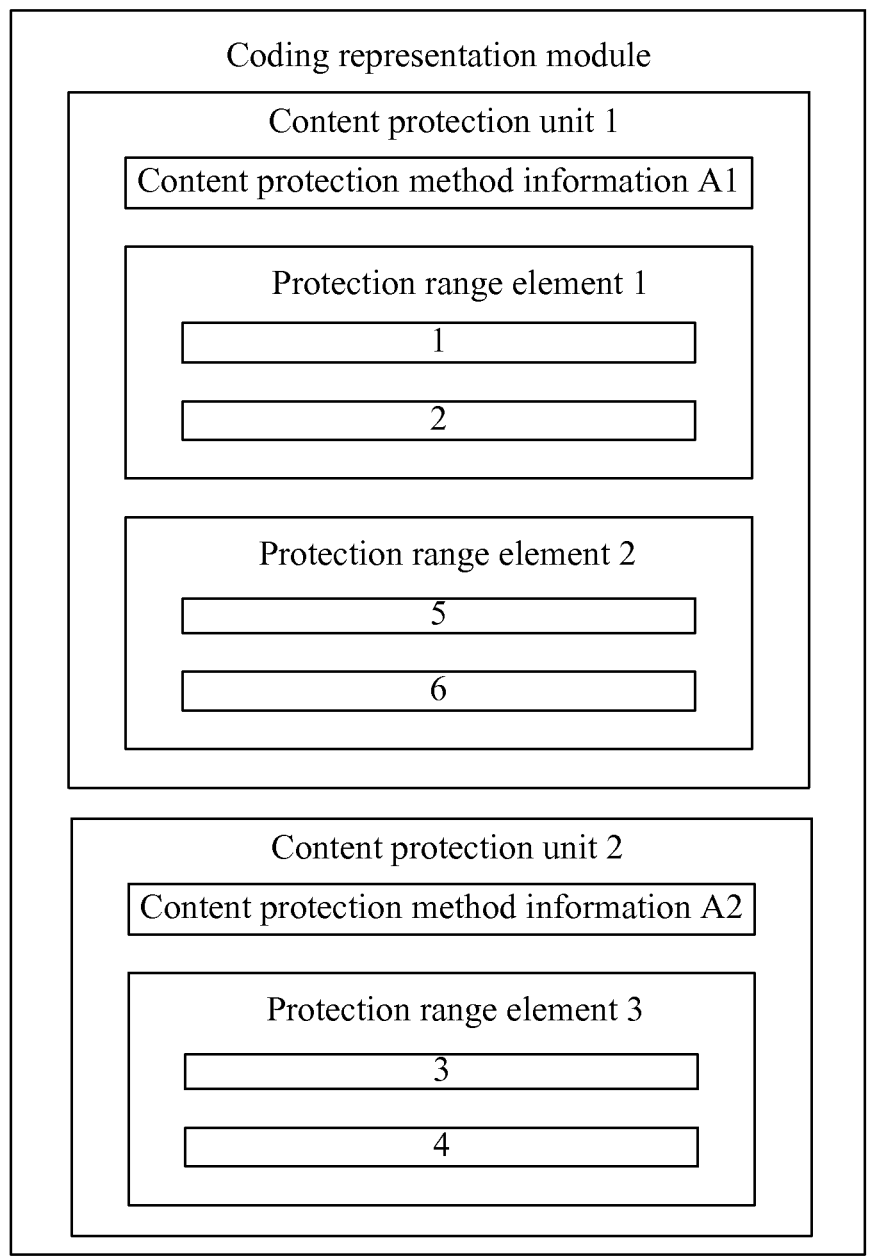

FIG. 4a is a schematic diagram illustrating content protection processing of the method embodiment shown in FIG. 2, and FIG. 4b is a schematic structural diagram of a coding representation module corresponding to a processing manner shown in FIG. 4a. As shown in FIG. 4a and FIG. 4b, one coding representation is segmented into eight media segments, where media segments S1 to S2 and S5 to S6 correspond to a content protection manner 1, and the content protection manner 1 may be described through content protection method information A1 to perform content protection on the media segments S1 to S2 and S5 to S6; media segments S3 to S4 correspond to a content protection manner 2, and the content protection manner 2 may be described through content protection method information A2 to perform content protection on the media segments S3 to S4; and content protection may not be performed on media segments S7 to S8.

Correspondingly, the MPD file may include a coding representation module for the coding representation, where the coding representation module may include two content protection units shown in FIG. 4b. These two content protection units correspond to the content protection manner 1 and the content protection manner 2 respectively. For a content protection unit 1 corresponding to the content protection manner 1, the content protection method information A1 and description of a range of a media segment to which the content protection method information A1 applies, that is, a protection range element 1 corresponding to the media segments S1 to S2 and a protection range element 2 corresponding to the media segments S5 to S6, are included. In this embodiment, range information in the protection range element is represented by adopting a start index and an end index of a media segment. For a content protection unit 2 corresponding to the content protection manner 2, the content protection method information A2 and an identifier of a range of a media segment to which the content protection method information A2 applies, that is, a protection range element 3 corresponding to the media segments S3 to S4, are included. It should be noted that, because the content protection method information may include a content protection method and information related to the content protection method, as long as there is one piece of information in the content protection method and the information related to the content protection method is different, the content protection method information is different. Therefore, the content protection method information A1 and the content protection method information A2 may adopt a same content protection method; however, information related to the content protection method is different, for example, the content protection method information A1 and the content protection method information A2 may both adopt a same encryption method, but adopted key information is different.

Figure 5:
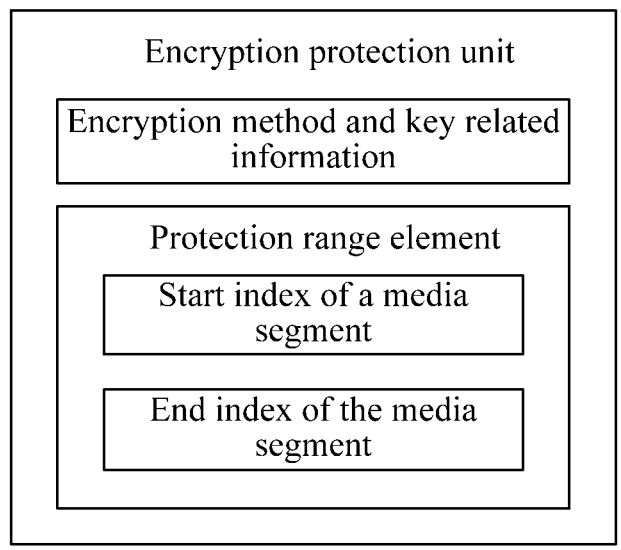

FIG. 5 is a specific schematic structural diagram of the content protection unit shown in FIG. 3a, and as shown in FIG. 5, the content protection unit is an encryption protection unit, and corresponding content protection method information is an encryption method and key related information. The key related information may be, for example, a means of obtaining a key.

Figure 6:
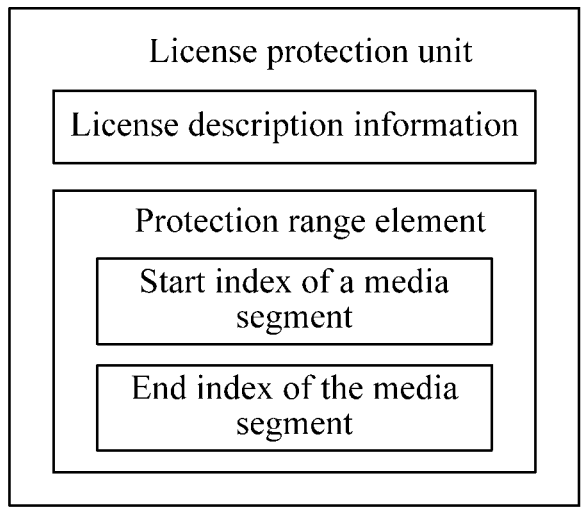

FIG. 6 is another specific schematic structural diagram of the content protection unit shown in FIG. 3a, and as shown in FIG. 6, the content protection unit is a license unit, and corresponding content protection method information is license description information. The license description information may be a use right of the license, for example, information related to reading and duplication; and definitely, may also include information about obtaining a key.

Figure 7:
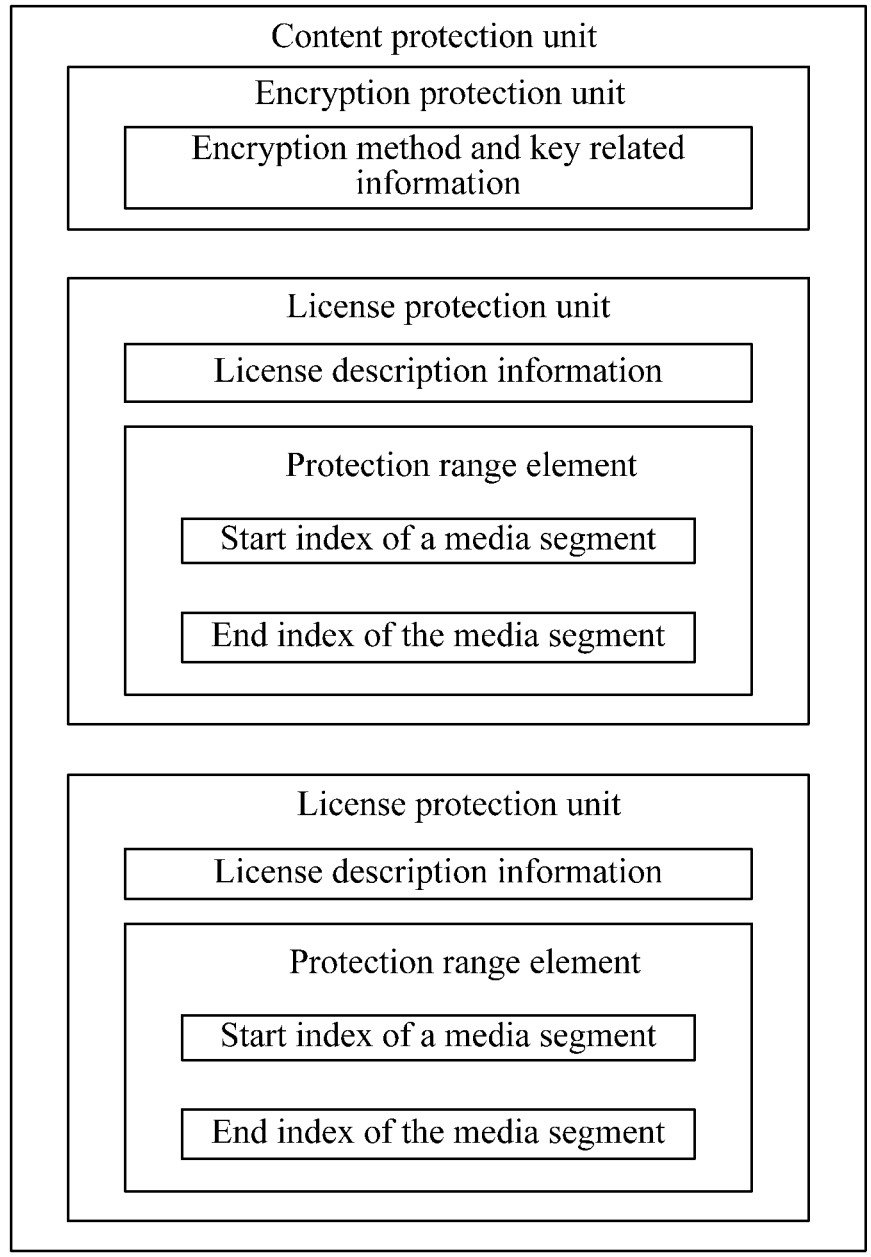
FIG. 7 is a schematic structural diagram of another content protection unit of the method embodiment shown in FIG. 2.

FIG. 7 is a schematic structural diagram of another content protection unit of the method embodiment shown in FIG. 2, and as shown in FIG. 7, media segments that need to be protected in a coding representation adopt a same encryption manner, while a use license is varied. The content protection unit in media presentation description shown in FIG. 7 includes an encryption unit and multiple license units. The encryption unit describes a public encryption manner, such as an encryption algorithm, key obtaining, and a correspondence between a key and a key identifier, which are applied to all protected media segments; because a use license is varied, the protection unit includes multiple license units. Each license unit includes license description information, such as a key identifier used for encryption and use right illustration, and at least one protection range unit, used to describe a range of one or more media segments to which the license unit applies. In this embodiment, even though a single encryption algorithm is adopted, the client needs to constantly update a key and/or a use right, which also achieves an effect of adopting different protection manners for media segments in the coding representation. In addition, because only one encryption method needs to be supported, content generation and implementation of the client are simple.

Step 203: Store the coding representation and the MPD file.

After completing the foregoing operation, the content protection apparatus may store the coding representation including multiple media segments and the corresponding MPD file. For example, the coding representation may be stored on a media server, and the MPD file may be stored on the media server, and may also be stored on any other devices as long as it can be ensured that the client can obtain the MPD file, which is not limited in this embodiment. The server maybe a server maintained by a content provider, and may also be a cache server (cache) or a gateway server (gateway) in a content delivery network; therefore, in this embodiment, the used media server only needs to be a common server that supports an HTTP protocol. Therefore, the client may obtain a media segment on which the content protection processing is performed from the server, and know a content protection manner adopted by each media segment in the coding representation according to the MPD file, so as to adopt corresponding processing, such as decryption and using media data within a right.

In this embodiment, a media segment in a coding representation is used as a unit of content protection, and the content protection may be performed on at least a part of media segments in the coding representation, so that protection manners of media segments in the coding representation are differentiated, so as to improve flexibility of content protection on an HTTP streaming media service, thereby meeting requirements on supporting a flexible business model by a content provider and a service provider. Moreover, during a content protection processing procedure, an MPD file may be generated, and the MPD file may include a content protection unit that describes a content protection manner adopted by a media segment in the coding representation, so that the client may perform a legal operation on the obtained media segment according to the MPD file.

Figure 8:
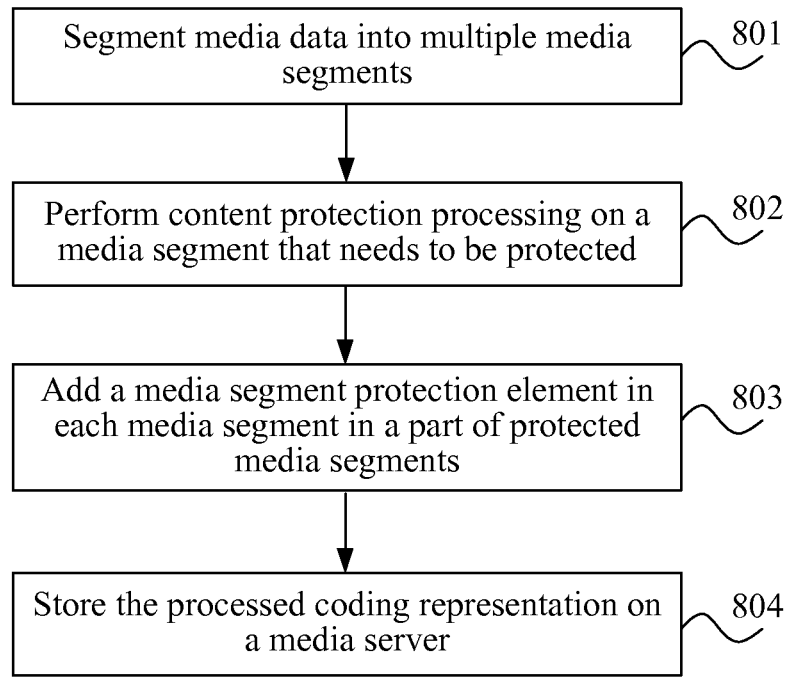
FIG. 8 is a flowchart of a third embodiment of a media data processing method according to the present invention.

FIG. 8 is a flowchart of a third embodiment of a media data processing method according to the present invention, and as shown in FIG. 8, the method in this embodiment may implement the foregoing second solution, and the method in this embodiment may include:

Step 801: Segment media data into multiple media segments.

An implementation method of step 801 is similar to that of the foregoing step 101, so details are not repeatedly described herein.

Step 802: Perform content protection processing on a media segment that needs to be protected.

The content protection processing may be, for example, encryption and limitation on a use right.

Step 803: Add a media segment protection element in each media segment in a part of protected media segments.

Preferably, the media segment protection element may be placed at a starting end or an ending end of a media segment.

The media segment protection element includes a content protection manner adopted by the media segment, that is, a media segment on which content protection processing needs to be performed includes an illustration of a content protection manner. Compared with the method embodiment shown in FIG. 2, in this embodiment, content of a MPD file may be simplified without the need of illustrating an application range of a content protection manner adopted by a media segment in the MPD file; each media segment is self-contained, and a client may process the protected media segment without the need of obtaining other information than the media segment.

Figure 9:
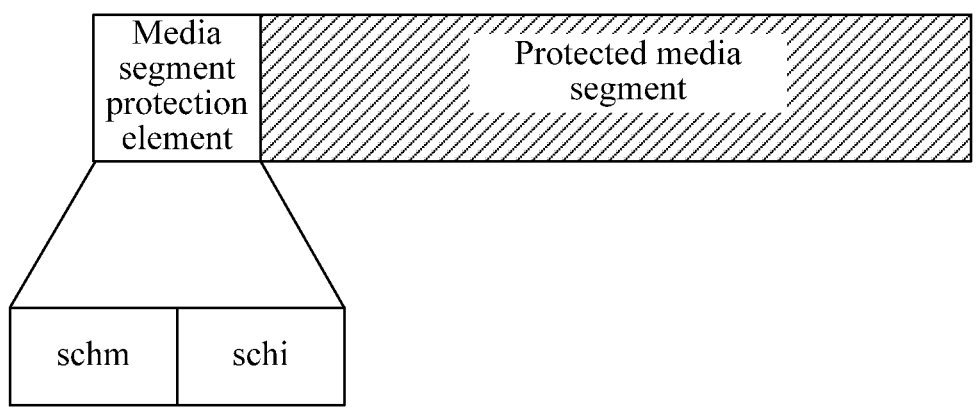
FIG. 9 is a schematic structural diagram of a media segment on which content protection processing is performed by adopting the method embodiment shown in FIG. 8.

FIG. 9 is a schematic structural diagram of a media segment on which content protection processing is performed by adopting the method embodiment shown in FIG. 8, and as shown in FIG. 9, a media segment protection element may be added before the protected media segment, where the media segment protection element may include: a content protection method scheme (schm for short) and information related to the content protection method scheme information (schi for short). It should be noted that, the media segment protection element itself is unprotected.

Step 804: Store the processed coding representation on a media server.

In this embodiment, a media segment in a coding representation is used as a unit of content protection, and the content protection may be performed on at least a part of media segments in the coding representation, so that protection manners of media segments in the coding representation are differentiated, so as to improve flexibility of performing the content protection on an HTTP streaming media service, thereby meeting a requirement when a content provider only limits accessing of some certain media segments by a user and opens a remaining media segment. Moreover, compared with the method embodiment shown in FIG. 2, in this embodiment, content of an MPD file may be simplified, and a client may perform de-protection processing without the need of obtaining other information than the media segment.

Figure 10:
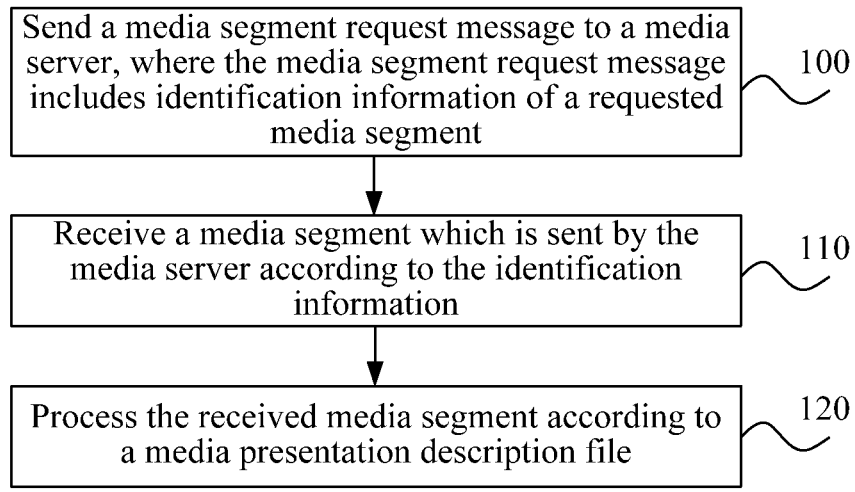
FIG. 10 is a flowchart of a fourth embodiment of a media data processing method according to the present invention.

FIG. 10 is a flowchart of a fourth embodiment of a media data processing method according to the present invention, and as shown in FIG. 10, the method in this embodiment is a method for a client to obtain media data on which the content protection processing shown in FIG. 1 is performed, and the method in this embodiment may include:

Step 100: Send a media segment request message to a media server, where the media segment request message includes identification information of a requested media segment. For example, the identification information of the media segment may be a uniform/universal resource locator (Uniform/Universal Resource Locator, URL for short) of the media segment, or a URL carrying a byte range, and is used to uniquely identify and obtain the media segment.

When a client needs to obtain media data, for example, request to watch a video, the client may send a media segment request message to a media server, where the media segment request message may include identification information of a requested media segment.

Step 110: Receive a media segment which is sent by the media server according to the identification information.

After receiving the media segment request message, the media server may send a media segment in a corresponding coding representation to the client according to the included identification information.

Step 120: Process the received media segment according to a media presentation description file.

The media presentation description file is used to describe a content protection manner adopted by at least a part of media segments in the coding representation.

Specifically, the MPD file is obtained before the client requests the media segment, and may come from the media server, and may also be transmitted by another client, which is not limited in this embodiment. In this embodiment, the MPD file may include a structure of the foregoing content protection unit shown in any one of FIG. 3a to FIG. 7. The client may know, according to the MPD, whether content protection processing is performed on the requested media segment and adopted content protection method information. If the content protection processing is performed on the media segment, de-protection processing is performed according to the content protection method information indicated in the MPD.

For example, in a case of continuous playing, before requesting and receiving each media segment, the client may know, according to the MPD file, that which kind of content protection processing is performed on which media segments, for example, know, according to protection range information in the content protection unit, that which kind of content protection processing is performed on which media segments. Therefore, if a media segment to be received does not adopt any content protection processing, the client may directly decode and play the media segment; and if the media segment to be received adopts the content protection processing, the client may make a de-protection preparation according to a content protection manner in advance, such as obtaining a key or a license. In a case of uncontinuous playing, the client adopts a similar processing procedure, and a difference from the continuous playing lies in that, the client cannot know a media segment to be requested in advance, and definitely, does not know an adopted content protection manner, and performs related processing only after determining the requested media segment; therefore, processing time spent in uncontinuous playing is longer than that spent in the continuous playing.

In this embodiment, a media segment in a coding representation is used as a unit of content protection, and the content protection may be performed on at least a part of media segments in the coding representation, so that protection manners of media segments in the coding representation are differentiated, so as to improve flexibility of performing content protection on an HTTP streaming media service, and when receiving a media segment on which the content protection processing is performed, a client may perform de-protection processing on the media segment according to an MPD file; therefore, a content provider may perform more flexible protection on content.

The technical solution of the method embodiment shown in FIG. 10 is described in detail by adopting a specific embodiment in the following.

Figure 11:
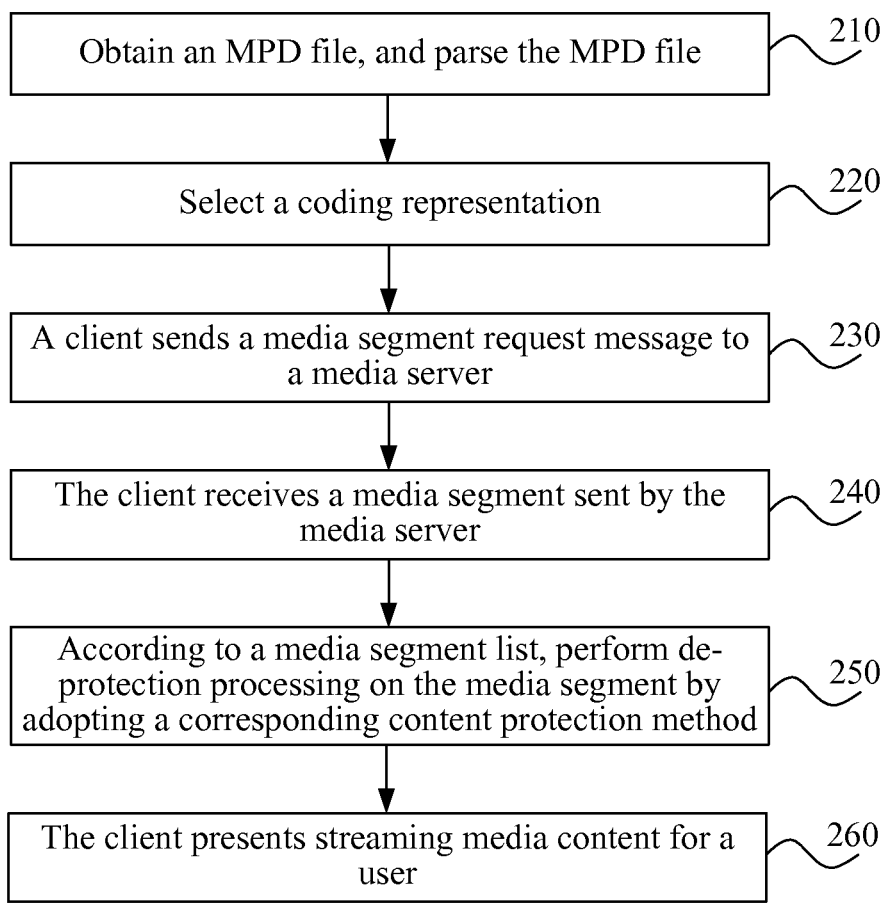
FIG. 11 is a flowchart of a fifth embodiment of a media data processing method according to the present invention.

FIG. 11 is a flowchart of a fifth embodiment of a media data processing method according to the present invention, and as shown in FIG. 11, the method in this embodiment may be used for uncontinuous playing of streaming media data, and the method in this embodiment may include:

Step 210: Obtain an MPD file and parse the MPD file.

Specifically, a client may generate a media segment list of a coding representation by parsing the MPD file, where the list includes a content protection manner adopted by a media segment in each coding representation.

Step 220: Select a media segment in the coding representation.

Specifically, when the client selects a media segment in the coding representation, in addition to factors that need to be considered, such as a currently available bandwidth, a bandwidth of the coding representation, a resolution, and a frame rate, when the coding representation needs to be selected according to the prior art, it is required to further consider whether the client is able to support a content protection manner of the selected media segment of the coding representation.

Step 230: The client sends a media segment request message to a media server.

Step 240: The client receives a media segment sent by the media server.

Step 250: According to the media segment list, perform de-protection processing on the media segment by adopting a corresponding content protection method.

The de-protection processing may be, for example, a decryption operation, so as to restore streaming media data before being protected, and use the streaming media data according to a right.

Step 260: The client presents streaming media content for a user.

In this embodiment, when using a media segment on which content protection processing is performed, the client may determine, according to the MPD file, whether the content protection processing is performed on the media segment, and perform corresponding de-protection processing on the media segment on which the content protection processing is performed. In this embodiment, a media segment in a coding representation is used as a unit of content protection, and the content protection may be performed on at least a part of media segments in the coding representation, so that protection manners of media segments in the coding representation are differentiated, so as to improve flexibility of performing the content protection on an HTTP streaming media service.

Figure 12:
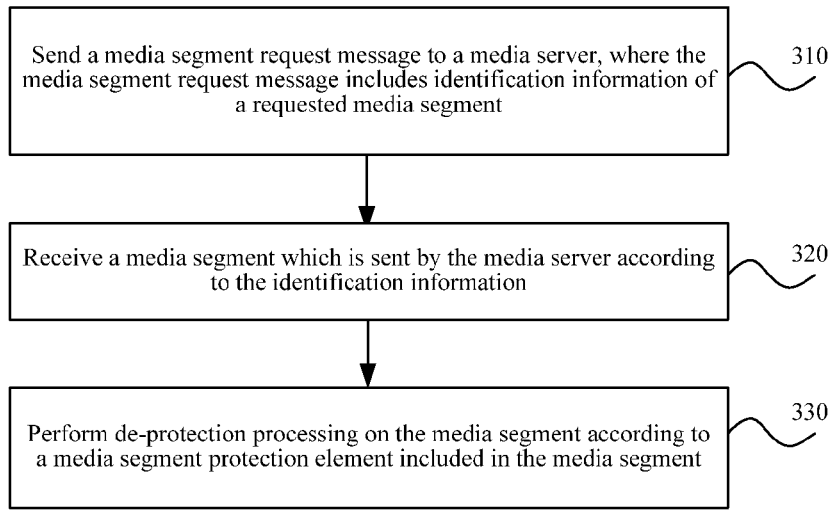
FIG. 12 is a flowchart of a sixth embodiment of a media data processing method according to the present invention.

FIG. 12 is a flowchart of a sixth embodiment of a media data processing method according to the present invention, and as shown in FIG. 12, the method in this embodiment is a method for a client to obtain streaming media data on which the content protection processing shown in FIG. 8 is performed, and the method in this embodiment may include:

Step 310: Send a media segment request message to a media server, where the media segment request message includes identification information of a requested media segment.

Step 320: Receive a media segment which is sent by the media server according to the identification information.

An implementation principle of steps 310 to 320 is similar to that of the foregoing steps 210 to 220, so details are not repeatedly described herein.

Step 330: Perform de-protection processing on the media segment according to a media segment protection element included in the media segment.

The media segment protection element includes a content protection manner adopted by the media segment. A structure of the media segment in this embodiment may be shown in FIG. 9.

Specifically, a difference between this embodiment and the foregoing method embodiment shown in FIG. 10 lies in that, in this embodiment, a media segment on which content protection processing is performed includes an illustration of a content protection manner; and compared with the method embodiment shown in FIG. 10, in this embodiment, content of an MPD file may be simplified, and an application range of a content protection manner adopted by a media segment does not need to be illustrated in the MPD file; each media segment is self-contained, and the client may perform de-protection processing without the need of obtaining other information than the media segment.

Figure 13:
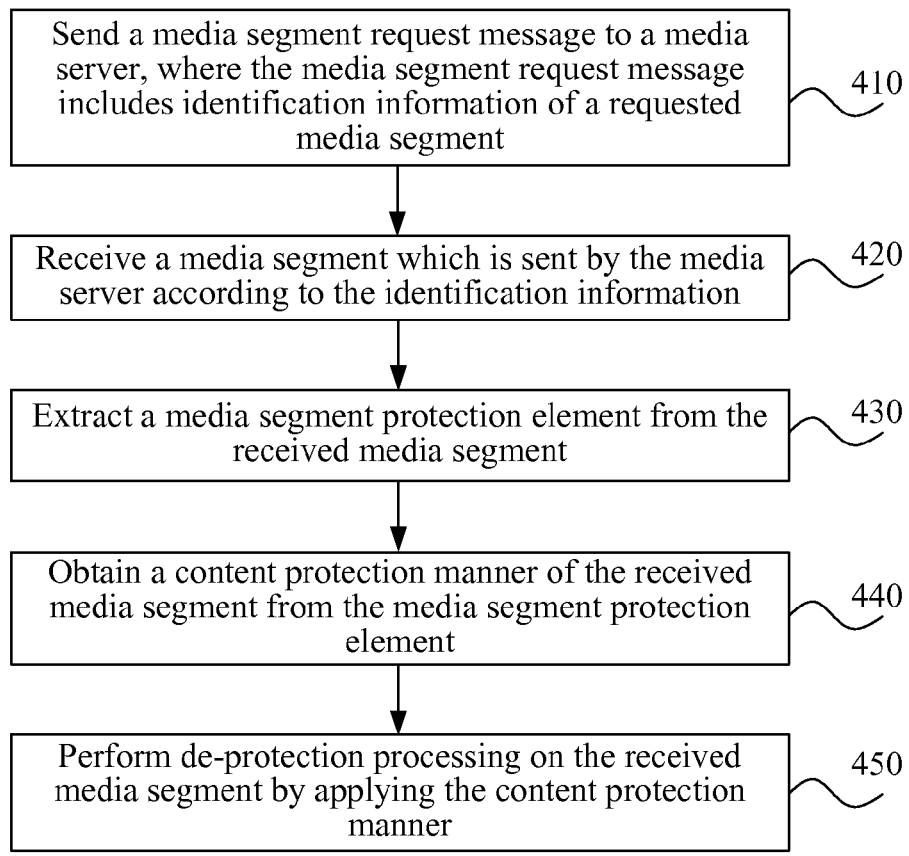
FIG. 13 is a flowchart of a seventh embodiment of a media data processing method according to the present invention.

FIG. 13 is a flowchart of a seventh embodiment of a media data processing method according to the present invention, and as shown in FIG. 13, the method in this embodiment provides details of the method embodiment shown in FIG. 12, and the method in this embodiment may include:

Step 410: Send a media segment request message to a media server, where the media segment request message includes identification information of a requested media segment.

Step 420: Receive a media segment which is sent by the media server according to the identification information.

An implementation principle of steps 410 to 420 is similar to that of the foregoing steps 310 to 320, so details are not repeatedly described herein.

Step 430: Extract a media segment protection element from the received media segment.

It should be noted that, before extracting the media segment protection element from the received media segment, a client may further determine whether the media segment includes the media segment protection element, so as to know whether content protection processing is performed on the media segment. This embodiment does not limit a determination manner adopted by the client, and persons skilled in the art may perform the determination according to the prior art, for example, through a length of the media segment.

In specific implementation, the client may extract the media segment protection element from a starting end or an ending end of the media segment.

Step 440: Obtain a content protection manner of the received media segment from the media segment protection element.

The client may further obtain a content protection manner of the media segment from the media segment protection element, including, for example, schm and schi.

Step 450: Perform de-protection processing on the received media segment by applying the content protection manner.

Specifically, the client may perform de-protection processing on the media segment according to schm and schi, and a specific processing manner is similar to the foregoing procedure of performing the de-protection processing by adopting the MPD file solution, so details are not repeatedly described herein.

In the foregoing two embodiments, a media segment in a coding representation is used as a unit of content protection, and the content protection may be performed on at least a part of media segments in the coding representation, so that protection manners of media segments in the coding representation are differentiated, so as to improve flexibility of performing the content protection on an HTTP streaming media service, thereby meeting a requirement when a content provider only limits accessing of some certain media segments by a user and opens a remaining media segment. Moreover, compared with the method embodiment shown in FIG. 2, in this embodiment, content of an MPD file may be simplified, and a client may perform de-protection processing without the need of obtaining other information than the media segment.

Figure 14:
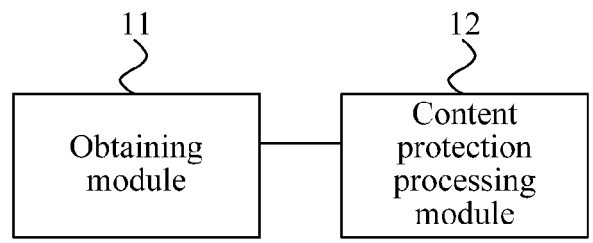
FIG. 14 is a schematic structural diagram of a first embodiment of a media data processing apparatus according to the present invention.

FIG. 14 is a schematic structural diagram of a first embodiment of a media data processing apparatus according to the present invention, and as shown in FIG. 14, the apparatus in this embodiment is a content protection apparatus, and the apparatus in this embodiment may include: an obtaining module 11 and a content protection processing module 12, where the obtaining module 11 is configured to obtain each media segment in a coding representation, and the content protection processing module 12 is configured to perform content protection processing on at least a part of media segments in the coding representation.

The apparatus in this embodiment maybe configured to execute the technical solution of the method embodiment shown in FIG. 1, and an implementation principle and a technical effect are similar to those in the method embodiment and are not repeatedly described herein.

Figure 15:
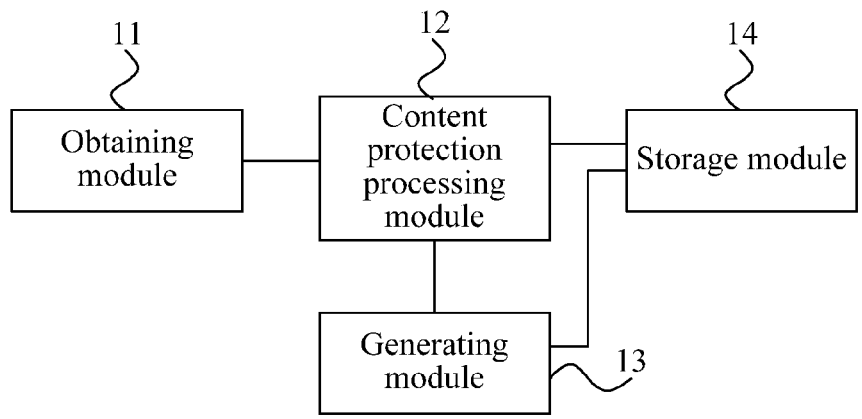
FIG. 15 is a schematic structural diagram of a second embodiment of a media data processing apparatus according to the present invention.

FIG. 15 is a schematic structural diagram of a second embodiment of a media data processing apparatus according to the present invention, and as shown in FIG. 15, on the basis of the structure of the apparatus shown in FIG. 14, furthermore, the apparatus in this embodiment may further include: a generating module 13 and a storage module 14, where the generating module 13 is configured to generate a media presentation description file, where the media presentation description file is used to describe a content protection manner adopted by at least a part of media segments in a coding representation, and the storage module 14 is configured to store the coding representation on which content protection processing is performed and the media presentation description file generated by the generating module.

The apparatus in this embodiment maybe configured to execute the technical solution of the method embodiment shown in FIG. 2, and an implementation principle and a technical effect are similar to those in the method embodiment and are not repeatedly described herein.

Figure 16:
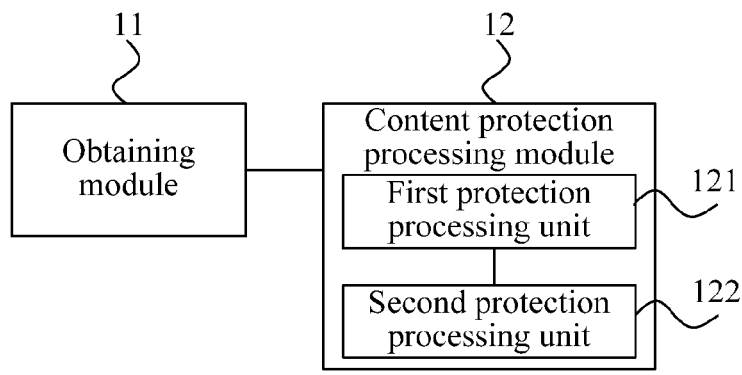
FIG. 16 is a schematic structural diagram of a third embodiment of a media data processing apparatus according to the present invention.

FIG. 16 is a schematic structural diagram of a third embodiment of a media data processing apparatus according to the present invention, and as shown in FIG. 16, on the basis of the structure of the apparatus shown in FIG. 14, in the apparatus in this embodiment, furthermore, the content protection processing module 12 may include: a first protection processing unit 121 and a second protection processing unit 122, where the first protection processing unit 121 is configured to perform protection processing on each media segment in the at least a part of media segments, and the second protection processing unit 122 is configured to add a media segment protection element in each media segment processed by the first protection processing unit 121, where the media segment protection element includes description information of a content protection manner adopted by the media segment.

Figure 17:
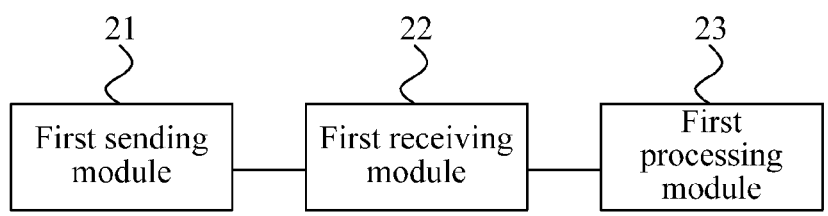
FIG. 17 is a schematic structural diagram of a fourth embodiment of a media data processing apparatus according to the present invention.

The apparatus in this embodiment may be configured to execute the technical solution of the method embodiment shown in FIG. 8, and an implementation principle and a technical effect are similar to those in the method embodiment and are not repeatedly described herein FIG. 17 is a schematic structural diagram of a fourth embodiment of a media data processing apparatus according to the present invention. As shown in FIG. 17, the apparatus in this embodiment is a processing apparatus deployed on a client, and may include: a first sending module 21, a first receiving module 22, and a first processing module 23, where the first sending module 21 is configured to send a media segment request message to a media server, where the media segment request message includes identification information of a requested media segment; the first receiving module 22 is configured to receive a media segment which is sent by the media server according to the identification information; and the first processing module 23 is configured to process the received media segment according to a media presentation description file, where the media presentation description file is used to describe a content protection manner adopted by at least a part of media segments in a coding representation.

The apparatus in this embodiment may be configured to execute the technical solution of the method embodiment shown in FIG. 10, and an implementation principle and a technical effect are similar to those in the method embodiment and are not repeatedly described herein.

Figure 18:
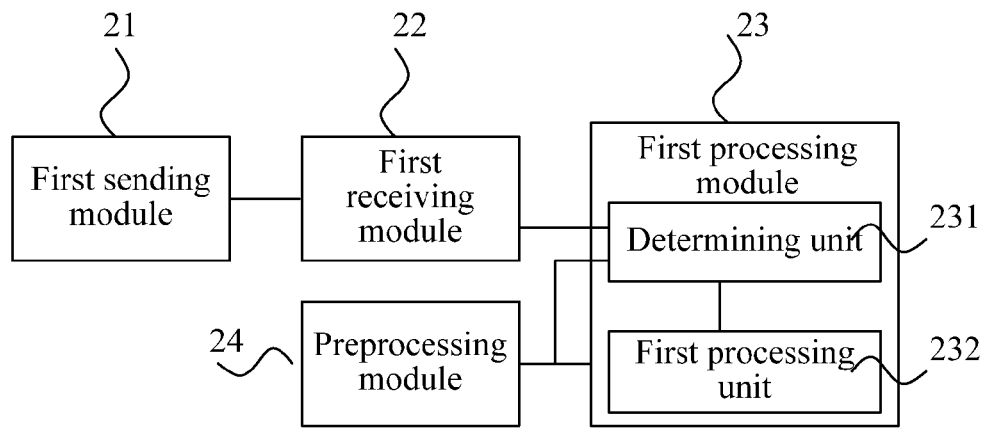
FIG. 18 is a schematic structural diagram of a fifth embodiment of a media data processing apparatus according to the present invention.

FIG. 18 is a schematic structural diagram of a fifth embodiment of a media data processing apparatus according to the present invention, and as shown in FIG. 18, on the basis of the apparatus shown in FIG. 17, the apparatus in this embodiment may further include: a preprocessing module 24; the first processing module 23 may specifically include: a determining unit 231 and a first processing unit 232, where the preprocessing module 24 is configured to obtain a media presentation description file, perform parsing processing on the media presentation description file, so as to obtain a content protection manner adopted by each media segment in a coding representation, and select a media segment in the coding representation according to the content protection manner; the determining unit 231 is configured to determining whether location information of the received media segment is in a range described by range information; and the first processing unit 232 is configured to: if the determining unit 231 determines that the location information is in the range, perform de-protection processing on the received media segment by adopting content protection method information.

The apparatus in this embodiment may be configured to execute the technical solution of the method embodiment shown in FIG. 11, and an implementation principle and a technical effect are similar to those in the method embodiment and are not repeatedly described herein.

Figure 19:
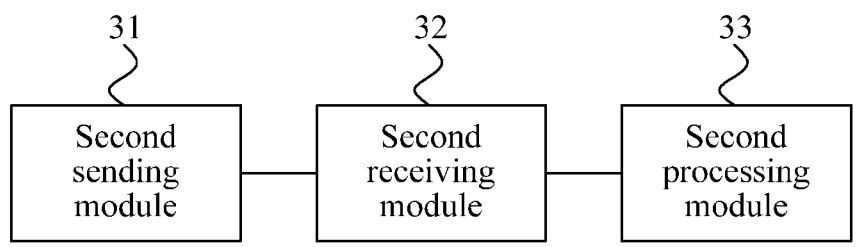
FIG. 19 is a schematic structural diagram of a sixth embodiment of a media data processing apparatus according to the present invention.

FIG. 19 is a schematic structural diagram of a sixth embodiment of a media data processing apparatus according to the present invention, and as shown in FIG. 19, the apparatus in this embodiment may include: a second sending module 31, a second receiving module 32, and a second processing module 33, where the second sending module 31 is configured to send a media segment request message to a media server, where the media segment request message includes identification information of a requested media segment; the second receiving module 32 is configured to receive a media segment which is sent by the media server according to the identification information; and the second processing module 33 is configured to process the media segment according to a media segment protection element included in the media segment, where the media segment protection element includes content protection method information adopted by the media segment.

The apparatus in this embodiment maybe configured to execute the technical solution of the method embodiment shown in FIG. 12, and an implementation principle and a technical effect are similar to those in the method embodiment and are not repeatedly described herein.

Figure 20:
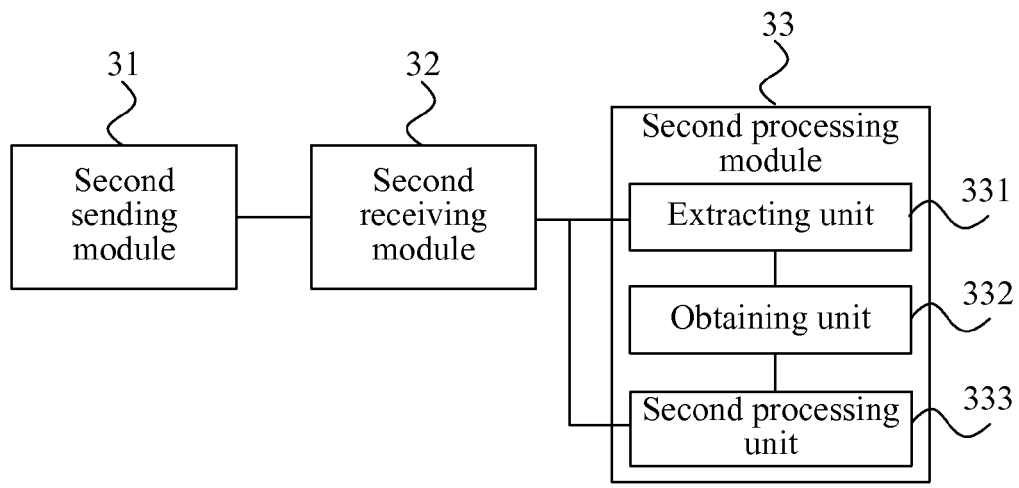
FIG. 20 is a schematic structural diagram of a seventh embodiment of a media data processing apparatus according to the present invention.

FIG. 20 is a schematic structural diagram of a seventh embodiment of a media data processing apparatus according to the present invention, and as shown in FIG. 20, on the basis of the apparatus shown in FIG. 19, in the apparatus in this embodiment, furthermore, the second processing module 33 may include: an extracting unit 331, an obtaining unit 332, and a second processing unit 333, where the extracting unit 331 is configured to extract a media segment protection element from a received media segment; the obtaining unit 332 is configured to obtain a content protection manner of the received media segment from the media segment protection element; and the second processing unit 333 is configured to perform de-protection processing on the received media segment by applying the content protection manner.

The apparatus in this embodiment maybe configured to execute the technical solution of the method-embodiment shown in FIG. 13, and an implementation principle and a technical effect are similar to those in the method embodiment and are not repeatedly described herein.

Persons of ordinary skill in the art should understand that, all or part of the steps of the foregoing method embodiments may be implemented by a program instructing relevant hardware. The foregoing program may be stored in a computer readable storage medium. When the program is executed, the foregoing steps included in the method embodiments are performed. The foregoing storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solution described in the foregoing embodiments or make equivalent replacements to part of the technical features of the technical solution described in the foregoing embodiments; however, these modifications or replacements do not make the essence of the corresponding technical solutions depart from the spirit and scope of the technical solutions of the embodiments of the present invention.

What is claimed is:

1. A media data processing method for providing HTTP streaming media service, comprising:

obtaining each media segment in a coding representation, wherein the coding representation consists of a plurality of media segments;

performing content protection processing on a first part of the media segments in the coding representation by adopting a first content protection manner;

performing content protection processing on a second part of the media segments in the coding representation by adopting a second content protection manner, wherein the first content protection manner is different with the second content protection manner; and generating a media presentation description file, wherein the media presentation description file is used to describe the first content protection manner adopted by the first part of media segments in the coding representation and the second content protection manner adopted by the second part of media segments in the coding representation, wherein the step of generating the media presentation description file comprises:

assigning, in the media presentation description file, a coding representation module corresponding to the coding representation;

assigning, in the coding representation module, a first content protection unit for indicating the first content protection manner and a second content protection unit for indicating the second content protection manner;

assigning, in the first content protection unit, content protection manner information for indicating the first content protection manner adopted by the first part of media segments and assigning, in the second content protection unit content protection manner information for indicating the second content protection manner adopted b the second cart of media segments; and assigning, in the first content protection unit, a first protection range element for indicating information of a range of the first part of media segments and assigning, in the second content protection unit, a second protection range element for indicating information of a range of the second part of media segments.

2. The method according to claim 1, wherein the content protection unit is an encryption protection unit, and the content protection manner information is an encryption method and key related information; or the content protection unit is a license unit, and the content protection manner information is license description information.

3. The method according to claim 1, wherein the first content protection manner comprises an encryption protection element and at least one license protection element, the encryption protection element comprises an encryption method and key related information that are adopted by the first part of media segments, the license protection element comprises license description information and protection range element, and the protection range element comprises information of a range of a media segment to which the license description information applies.

4. The method according to claim 1, further comprising:
storing the coding representation on which the content protection processing is performed and the media presentation description file.

5. The method according to claim 1, wherein the first protection range element comprise a start index and an end index of the first part of media segments, or start time and end time of the first part of media segments.

6. The method according to claim 1, wherein performing content protection processing on the first part of media segments in the coding representation comprises:
performing protection processing on each media segment in the first part of media segments, and adding a media segment protection element in each media segment on which the protection processing is performed, wherein the media segment protection element comprises description information of a content protection manner adopted by the media segment.

7. A media data processing method for providing HTTP streaming media service, comprising:
obtaining a media presentation description file, wherein the media presentation description file is used to describe a first content protection manner adopted by a first part of media segments in a coding representation and a second content protection manner adopted by a second part of media segments in the coding representation, wherein the first content protection manner is different with the second content protection manner, wherein the coding representation consists of a plurality of media segments, wherein the media presentation description file comprising a coding representation module corresponding to the coding representation, wherein the coding representation module comprising content protection manner information for indicating the first content protection manner adopted by the first part of media segments and content protection manner information for indicating the second content protection manner adopted by the second part of media segments, wherein the first content protection unit comprising a first protection range element for indicating information of a range of the first part of media segments, wherein the second content protection unit comprising a second protection range element for indicating information of a range of the second part of media segments;
performing parsing processing on the media presentation description file, in order to obtain the first content protection manner adopted by each media segment in the first part of the coding representation, wherein the parsing processing comprising:
identifying content protection manner information of the first content protection manner, and identifying range information of the first part of the media segments;
selecting a media segment in the first part of the coding representation according to the first content protection manner;
sending a media segment request message to a media server, wherein the media segment request message comprises identification information of a requested media segment;
receiving a media segment which is sent by the media server according to the identification information; and
determining whether location information of the received media segment is in the range of the first part of media segments, and when the location information is in the range of the first part of media segments, performing de-protection processing on the received media segment by adopting the first content protection manner.

8. A media data processing apparatus for providing HTTP streaming media service, comprising:
an obtaining module, configured to obtain each media segment in a coding representation, wherein the coding representation consists of a plurality of media segments;
a content protection processing module, configured to perform content protection processing on a first part of media segments in the coding representation by adopting a first content protection manner, perform content protection processing on a second part of media segments in the coding representation by adopting a second content protection manner, wherein the first content protection manner is different with the second content protection manner;
a generating module, configured to generate a media presentation description file, wherein the media presentation description file is used to describe the first content protection manner adopted by the first part of media segments in the coding representation and the second content protection manner adopted by the second part of media segments in the coding representation; wherein the generating module is further configured to:
assign, in the media presentation description file, a coding representation module corresponding to the coding representation;
assign, in the coding representation module, a first content protection unit for indicating the first content protection manner and a second content protection unit for indicating the second content protection manner;
assign, in the first content protection unit, content protection manner information for indicating the first content protection manner adopted by the first part of media segments and assign, in the second content protection unit, content protection manner information for indicating the second content protection manner adopted by the second part of media segments; and
assign, in the first content protection unit, a first protection range element for indicating information of a range of the first part of media segments and assign, in the second content protection unit, a second protection range element for indicating information of a range of the second part of media segments; and
a storage module, configured to store the coding representation on which the content protection processing is performed and the media presentation description file generated by the generating module.

9. The apparatus according to claim 8, wherein the content protection processing module comprises:
- a first protection processing unit, configured to perform protection processing on each media segment in the first part of media segments; and
- a second protection processing unit, configured to add a media segment protection element in each media segment processed by the first protection processing unit, wherein the media segment protection element comprises description information of a content protection manner adopted by the media segment in the first part.

10. A media data processing apparatus for providing HTTP streaming media service, comprising:
- a preprocessing module, configured to:
  - obtain a media presentation description file, wherein the media presentation description file is used to describe a first content protection manner adopted by a first part of media segments in a coding representation and a second content protection manner adopted by a second part of media segments in the coding representation, wherein the first content protection manner is different with the second content protection manner, wherein the coding representation consists of a plurality of media segments, wherein the media presentation description file comprising a coding representation module corresponding to the coding representation, wherein the coding representation module comprising content protection manner information for indicating the first content protection manner adopted by the first part of media segments and content protection manner information for indicating the second content protection manner adopted by the second part of media segments, wherein the first content protection unit comprising a first protection range element for indicating information of a range of the first part of media segments, wherein the second content protection unit comprising a second protection range element for indicating information of a range of the second part of media segments;
  - perform parsing processing on the media presentation description file, in order to obtain the first content protection manner adopted by each media segment in the first part of the coding representation, identify content protection manner information of the first content protection manner and identify range information of the first part of media segments; and
  - select a media segment in the first part of the coding representation according to the first content protection manner,
- a first sending module, configured to send a media segment request message to a media server, wherein the media segment request message comprises identification information of a to be requested media segment in the first part of the coding representation;
- a first receiving module, configured to receive a media segment which is sent by the media server according to the identification information;
- a determining unit, configured to determine whether location information of the received media segment is in the range of the first part of media segments; and
- a first processing unit, configured to perform de-protection processing on the received media segment by adopting the first content protection manner when the determining unit determines that the location information is in the range of the first part of media segments.

* * * * *